United States Patent Office 3,330,269
Patented July 11, 1967

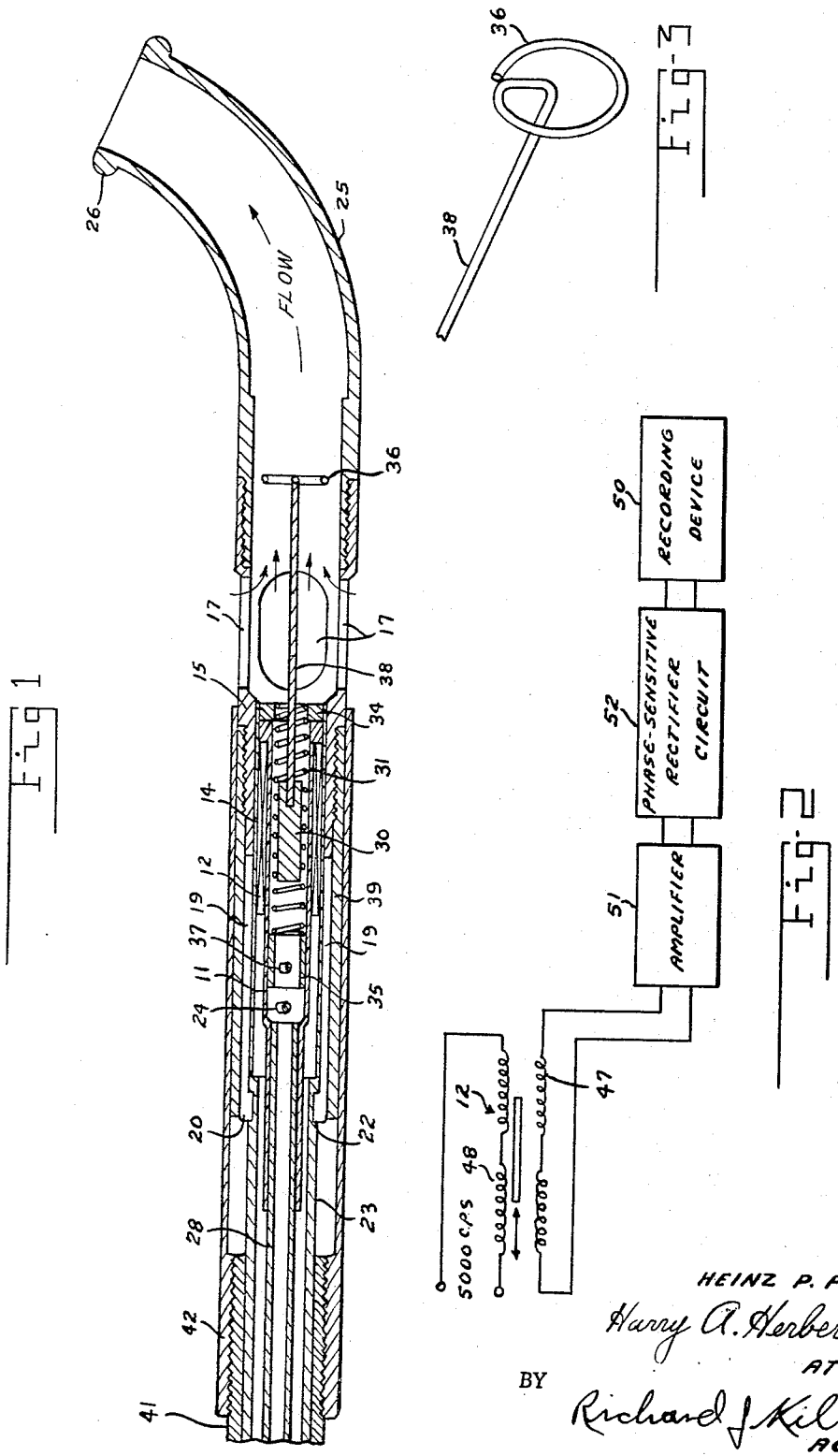

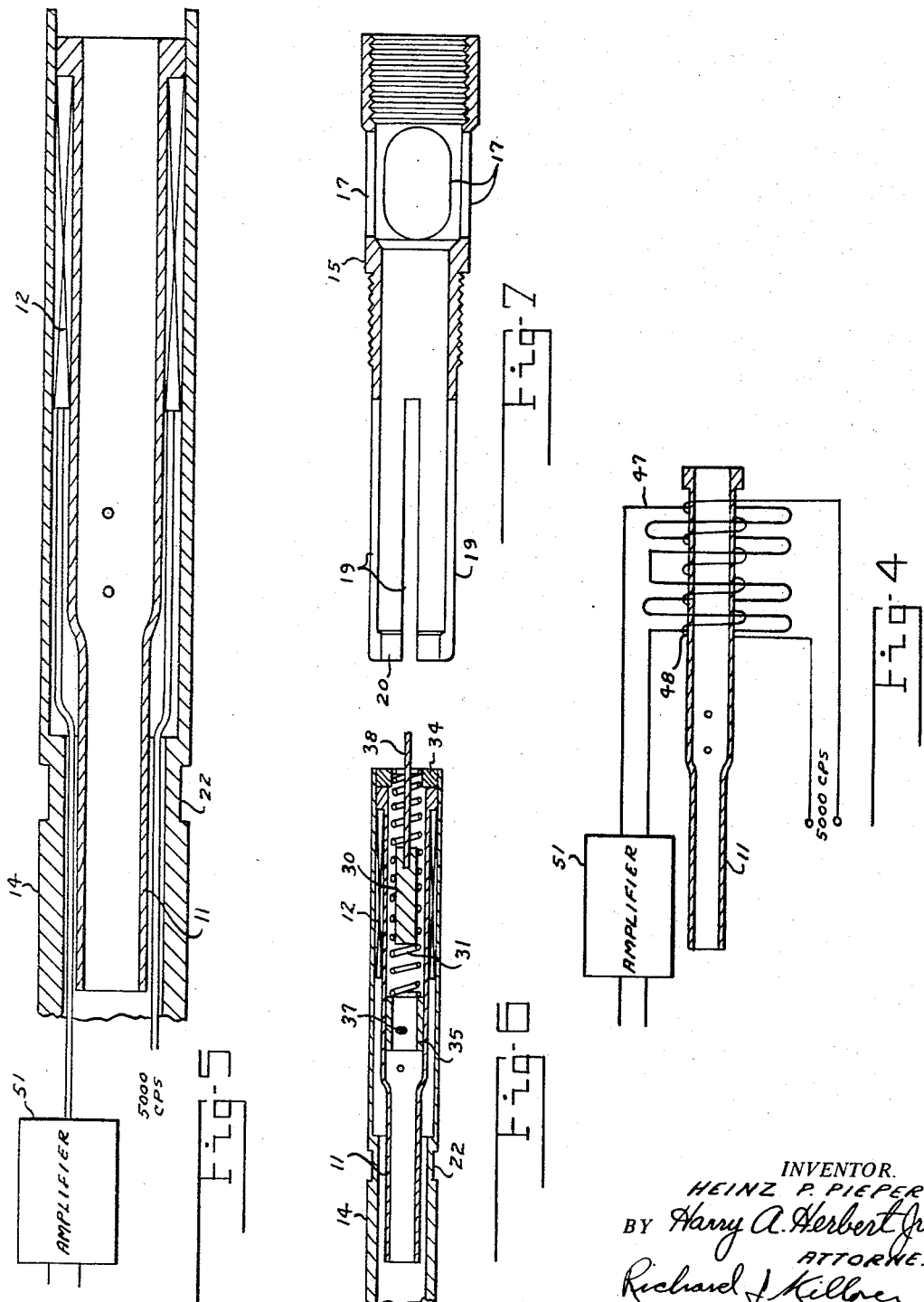

3,330,269
CATHETER-TIP BLOOD FLOWMETER FOR CORONARY ARTERIAL FLOW
Heinz P. Pieper, Columbus, Ohio, assignor to the United States of America as represented by the Secretary of the Air Force
Filed Oct. 26, 1964, Ser. No. 406,637
3 Claims. (Cl. 128—2.05)

ABSTRACT OF THE DISCLOSURE

A device for measuring coronary blood flow has a support tube with the primary windings of a differential transformer wound thereon, and the secondary windings wound on top of the primary windings. An iron core member for the differential transformer is supported on a spring member within said support tube, with the entire assembly being supported within the end portion of an outer tube member. A blood inflow cannula is secured to the outer tube member. The cannula has three holes spaced 120° apart through which the blood flows. A sliding tube is provided on said outer tube to close said holes. A curved tip member is connected to the cannula. A second tube passes through said outer tube member and is connected to said support tube so that heparin solution may be supplied to the core assembly to prevent clotting. A flow sensing element, connected to said core member, is positioned in the blood flow path within the tip member. The differential transformer is energized by a 5000 c.p.s. signal, with the output of the differential transformer being connected to a recording device.

---

One object of the invention is to provide an improved system for giving a continuous pulse-by-pulse indication of coronary flow.

Another object of the invention is to provide a flowmeter which may be inserted directly in the blood stream of an anesthetized test animal and in which there is a passage which allows for the injection of drugs into the coronary system.

A further object is to provide a flowmeter for insertion directly into the bloodstream, which permits a zero flow indication to be obtained.

These and other objects will be more fully understood from the following detailed description taken with the drawing, wherein:

FIG. 1 is a sectional view of the flowmeter of the invention;

FIG. 2 is a block diagram of the sensing circuit for the device of FIG. 1; and

FIG. 3 is a perspective view of the blood flow sensing element for the device of FIG. 1;

FIG. 4 is a partially schematic illustration showing the position of the windings of FIG. 2 with respect to the differential transformer support tube member of FIG. 1;

FIG. 5 is an enlarged partially schematic sectional view showing the differential transformer support tube member and differential transformer within an outer tube member for the device of FIG. 1;

FIG. 6 is a sectional view showing the device of FIG. 5 with the differential transformer core member supported within the differential transformer support tube member; and FIG. 7 is a sectional view of the cannula of the device of FIG. 1.

The flowmeter of this invention is adapted for use in closed-chest dogs. The sensing element is contained within a tube 2.5 cm. long and 4.2 mm. in diameter. The sensing assembly is attached to the tip of a rigid catheter with a second tube provided therein which is open to the bloodstream through the sensing assembly. This tube allows for the injection of drugs into the coronary system. Inlet passages are provided in the side of a sensing element which permit a flow of blood past the sensing element and out through an opening in the end of the sensing assembly. A movable sleeve is provided for opening and closing the inlet passages to provide for a zero flow indication. The movable sleeve is operated by means of a movable tube surrounding the rigid catheter.

Reference is now made to FIG. 1 of the drawing which shows a tube 11 on which are wound the primary and secondary windings of a differential transformer indicated generally at 12. The primary windings 48, as shown in FIG. 2, are wound on tube 11, as shown schematically in FIG. 4, with the secondary windings 47, shown in FIG. 2, wound on top of the primary windings, as shown schematically in FIG. 4. Tube 11 and the windings thereon are then coated with epoxy resin, not shown, and inserted into tube 14, as shown schematically in FIG. 5. After the core member 30, which will be described later, is inserted in tube 11 and secured by a pin 37, as shown in FIG. 6, tube 14 is inserted into an inflow cannula 15 which has three holes 17 spaced 120° apart. Cannula 15, shown in FIG. 7, also has 4 longitudinal slots 19 spaced 90° apart, two of which are shown in FIG. 1, and locking rim 20 at the end thereof, for engaging a groove 22 on tube 23. A pin 24 prevents rotation of the cannula 15 with respect to tubes 11 and 14. A curved tip member 25 is threaded onto the end of cannula 15. Member 25 has an enlarged rim 26 to provide a seal to prevent blood flow past the outside of member 25. Tube 11 is secured to the end of a tube 28 which is located within tube 23. The iron core member 30 is supported on the axis of the differential transformer 12 by means of a spring 31 and spring support rings 34 and 35. The spring 31 may be soldered to the core 30 and the rings 34 and 35. The ring 34 abuts against the end of tube 11 and the spring is extended and held in its extended position, to support the core member 30, by means of a pin 37. The entire core assembly is coated with silicone, not shown. A sleeve 39 is threaded onto the cannula 15 and keeps the pins 24 and 37 in place. The pin 37 has a loose fit so that twisting or bending forces acting on the tip member 25, during insertion of the flowmeter into the animal, will not be transmitted to the transformer core assembly. A flow sensing element 36 in the shape of a ring, as shown in FIG. 3, is made of constantan wire. The shaft 38 of ring 36 is cemented into the iron core 30 by means of epoxy resin. Tubes 23 and 28, of which only the ends are shown, are approximately 40 cm. in length and are made of hypodermic stainless steel tubing. A tube 41 surrounds the tube 23 and extends substantially its entire length. A sleeve 42 is threaded onto tube 41 and surrounds sleeve member 39 and cannula 15. Movement of tube 41 provides a longitudinal movement for sleeve 42 to open and close the holes 17. Closing of the holes 17 provides a means for establishment of a zero flow indication when desired during a test.

The output of the secondary winding 47 of differential transformer 12 is applied to a recording device 50 through an amplifier 51 and a phase sensitive rectifier circuit 52. The primary winding 48 of the differential transformer 12 is energized by an A.C. signal, shown as 5000 c.p.s. for purpose of illustration. A circuit diagram for a sensing circuit which may be used is shown in Zeitschrift Biol. 105, pp. 49–65, 1952.

In the operation of the device, the flowmeter is passed through the right carotid artery of the test dog and, with the aid of a fluoroscope, is placed in the ascending aorta, with the curved portion wedged into the orifice of either left anterior descendens or circumflex artery. Blood from the aorta enters the flowmeter through the openings 17, flows past the sensing element 36 and out through the curved end of tube 25 into the coronary artery. Movement of the sensing element 36 is transmitted to the core 30 to unbalance the differential transformer 12, the output of which is recorded by a standard recording device 50. When desired, to obtain a zero reading, tube 41 may be moved along tube 23 thus moving sleeve 42 over the openings 17, stopping the flow of blood past the sensing element 36. Occasionally, heparin solution may be applied to the core assembly through tube 28 to prevent clotting. The core assembly is thoroughly cleaned after each test.

There is thus provided a catheter-tip flowmeter for measuring coronary blood flow in test animals.

While certain specific embodiment has been described it is obvious that numerous changes may be made without departing from the general principles and scope of the invention.

I claim:

1. A device for obtaining a coronary arterial blood flow measurement in an intact anesthetized test animal, comprising: a first elongated tubular element; a second elongated tubular element within and spaced from said first tubular element; a third tubular element attached to the end of said first tubular element; a fourth tubular element within said third tubular element and secured to the end of said second tubular element; a differential transformer having its primary and secondary windings located between said third and said fourth tubular elements; means for energizing the primary windings of said transformer; a recording device; means for applying the output of said secondary windings to said recording device; a spring member; means for supporting said spring in an extended condition within said fourth tubular element; an iron transformer core member supported by said spring centrally within said differential transformer windings; said third tubular element having a plurality of circumferentially spaced openings at the end remote from said first tubular element; means for selectively closing said openings; a hollow curved tip member threadably engaged to said third tubular element at the end adjacent said openings; said tip member having an enlarged outer rim at the end remote from said third tubular element; an annular blood flow sensing element within said tip member; and means for rigidly attaching said sensing element to said transformer core member.

2. A device for obtaining a coronary arterial blood flow measurement in an intact anesthetized test animal, comprising: a first elongated tubular element; a second elongated tubular element within and spaced from said first tubular element; a third tubular element attached to the end of said first tubular element; a fourth tubular element within said third tubular element and secured to the end of said second tubular element; a differential transformer having its primary and secondary windings located between said third and said fourth tubular elements; means for energizing the primary windings of said transformer; a recording device; means for applying the output of said secondary windings to said recording device; a spring member; means for supporting said spring in an extended condition within said fourth tubular element; an iron transformer core member supported by said spring centrally within said differential transformer windings; said third tubular element having a plurality of circumferentially spaced openings at the end remote from said first tubular element; a fifth tubular element slidably supported on the outer surface of said first tubular element and extending substantially the full length thereof; means, attached to said fifth tubular element, for selectively closing said openings; a hollow curved tip member threadably engaged to said third tubular element at the end adjacent said openings; said tip member having an enlarged outer rim at the end remote from said third tubular element; an annular blood flow sensing element within said tip member; and means for rigidly attaching said sensing element to said transformer core member.

3. A device for obtaining a coronary arterial blood flow measurement in an intact anesthetized test animal, comprising: a first elongated stainless steel tube; a second elongated stainless steel tube within and spaced from said first tube; a third stainless steel tube attached to the end of said first tube; a fourth tube within said third tube and secured to the end of said second tube; a differential transformer having its primary and secondary windings surrounding said fourth tube and being secured within said third tube; means for energizing the primary windings of said transformer; a recording device; means for applying the output of said secondary windings to said recording device; a spring member; means for supporting said spring in an extended condition within said fourth tube; an iron transformer core member supported on said spring centrally within said differential transformer windings; said third tube having a plurality of circumferentially spaced openings at the end remote from said first tube; a fifth tube slidably supported on the outer surface of said first tube and extending substantially the full length thereof; means attached to said fifth tube, for selectively closing said openings; a hollow curved tip member threadably engaged on said third tube; said tip member having an enlarged outer rim at the end remote from said third tube; an annular blood flow sensing element within said tip member; and means for rigidly attaching said sensing element to said transformer core member.

References Cited

UNITED STATES PATENTS

| | | | |
|---|---|---|---|
| 2,634,721 | 4/1953 | Greenwood | 128—2.05 |
| 2,720,113 | 10/1955 | Statham | 73—398 |
| 3,075,515 | 1/1963 | Richards | 128—2.05 |

RICHARD A. GAUDET, *Primary Examiner.*

SIMON BRODER, *Examiner.*